United States Patent Office 3,404,783
Patented Oct. 8, 1968

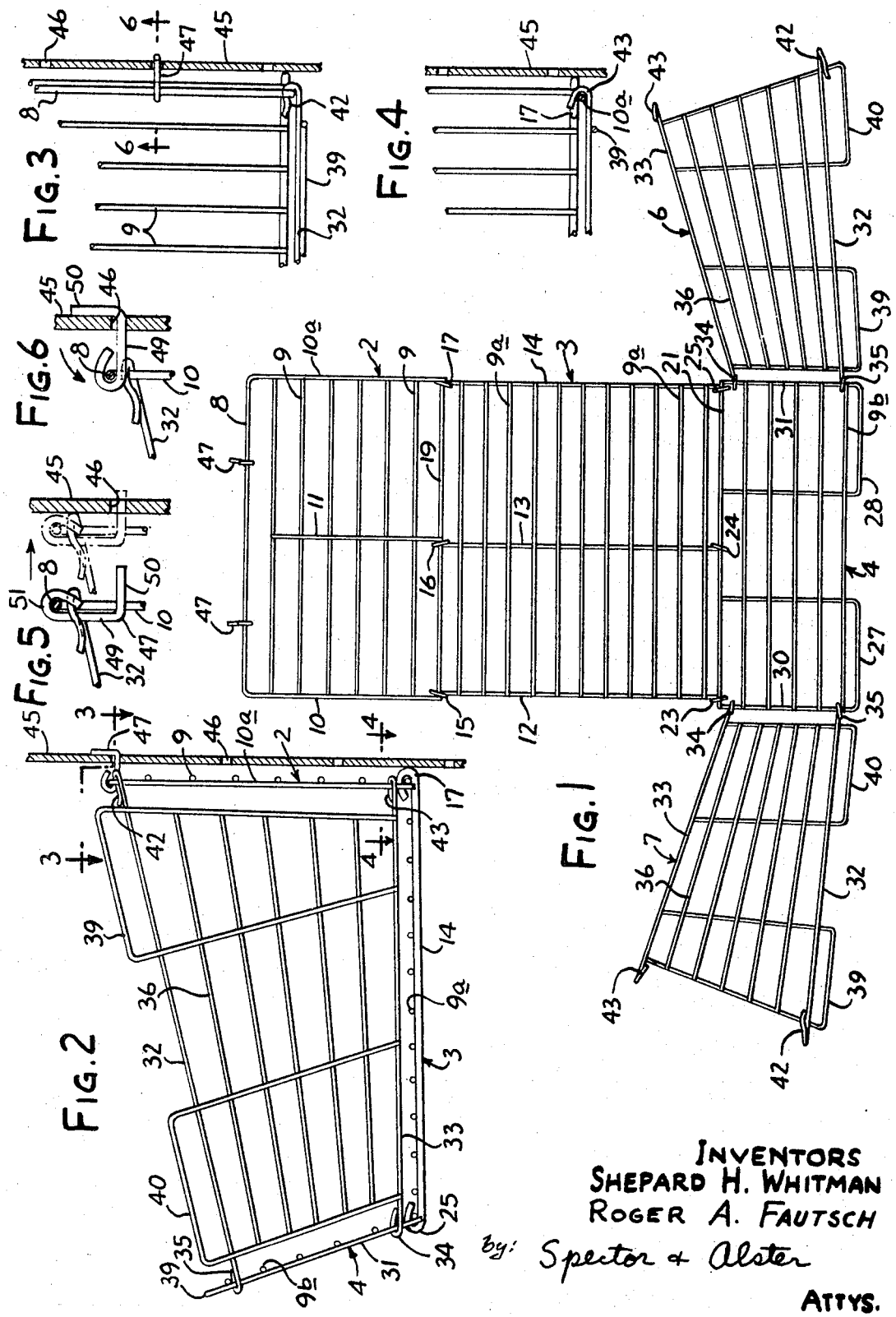

3,404,783
WIRE BASKET
Shepard H. Whitman and Roger A. Fautsch, Chicago, Ill., assignors to Dynamic Displays, Inc., Chicago, Ill., a corporation of Illinois
Filed Dec. 6, 1966, Ser. No. 599,434
1 Claim. (Cl. 211—88)

ABSTRACT OF THE DISCLOSURE

A collapsible wire basket has pivotally connected walls and cooperating elements on the margins of the walls for releasably retaining the basket in set-up position. The walls include portions that shield sharp edges of a wire. At the upper wire rod margin of one wall are swivelly mounted hooks. The hooks have angularly related portions for insertion into selected holes of a wall board or other fixture to mount tre basket thereon while keeping the basket level.

---

This invention relates to improvements in wire baskets, particularly those used for the display of merchandise in stores.

It is an object of the present invention to provide an open top wire basket that may be shipped in collapsed form and which may be quickly and easily set up by unskilled labor.

It is a further and more specific object of the present invention to provide a wire basket of the type stated in which there are mounting hooks swivelly and slidably mounted on one wall of the basket and adapted for engagement with a perforated board or like fixture for attaching the basket thereto. To mount the basket onto the board, the swivelly mounted hooks may be initially pushed through holes in the board and then rotated to their final positions, all without the necessity of rotating (i.e. partially upending) the basket. Since the hooks are slidable along the basket wall, they may be selectively spaced as desired and as determined by the spacing of the holes in the board. The foregoing construction has the advantage in that the basket may be set up and preloaded in some other part of the store before the basket is attached to the board because there is no need for tipping the loaded basket in order to mount it on the board. Furthermore, since the basket need not be tipped to be mounted on the board, it may be mounted in a position just below a shelf or other object which might otherwise obstruct the mounting of the basket.

It is an additional object of the present invention to provide a basket of the type stated in which, to a substantial extent, the sharp edges of the wires of the basket are shielded to minimize injury to persons handling the basket.

The attainment of the above and further objects of the present invention will be apparent from the following description taken in conjunction with the accompanying drawing forming a part thereof.

In the drawing:
FIG. 1 is a top plan view of a basket constructed in accordance with and embodying the present invention, the basket onto the perforated board.

FIG. 2 is a side-elevational view of a set-up basket and showing the same attached to a vertically extending perforated board;

FIG. 3 is a fragmentary sectional view taken along line 3—3 of FIG. 2;

FIG. 4 is a fragmentary sectional view taken along line 4—4 of FIG. 2; and

FIGS. 5 and 6 are fragmentary sectional views on an enlarged scale and showing the manner of mounting the basket oto the perforated board.

Referring now in more detail and by reference characters to the drawing, which illustrates a preferred embodiment of the present invention, 1 designates a basket formed of metalic wire rod and comprising a back wall 2, a bottom wall 3, a front wall 4 and side walls 6, 7. In the condition shown in FIG. 1, the basket 1 is in a collapsed condition wherein all of the walls lie in substantially the same plane, as would be the case if the basket of FIG. 1 were laid on a flat table top.

Each of the walls is formed of intersecting wire rods that are welded or otherwise secured together at their intersections such that each side of the basket is an open grid. In this regard the back wall 2 is formed of a U-shaped wire 8 with parallel wires 9 running between the sides 10, 10a of the U-shaped wire 8. A reinforcing wire 11 runs traversely of the wires 9 midway between the sides 10, 10a. The bottom wall 3 is substantially coextensive in width with the back wall 2 and is made up of wires 9a which are parallel to the wires 9, and with cross wires 12, 13, 14 which are perpendicular to the wires 9a. The ends of the cross wires 12, 13, 14 nearest the back wall 2 are bent to form loops 15, 16, 17 that embrace the marginal wire 19 of the back wall 2 in such manner as to prevent separation therefrom but which provide a hinge connection between the walls 2, 3.

The front wall 4 is formed of parallel wires 9b among which is a marginal wire 21 that is received in loops 23, 24, 25 formed on the other ends of the cross wires 12, 13, 14 and which form a non-separable hinge connection between the bottom wall 3 and front wall 4. The front wall 4 also includes a pair of U-shaped wires 27, 28, the sides of which are transverse to the wires 9b. One side 30, 31 of each wire 27, 28 is approximately coincident with the edges of the wires 9b. The walls 2, 3, 4 thus defined opposed margins formed, on the one hand, by the wire portions 30, 12, 10 and, on the other hand, by the wire portions 31, 14, 10a.

The side walls 6, 7 have upper and lower wires 32, 33 which terminate in loops 34, 35 that embrace the wire portions 30, 31 to prevent retraction therefrom and thereby form hinge connections between each side wall 6, 7 and the front wall 4. Between the upper and lower wires 32, 33 of each side wall are intermediate wires 36 which are joined together and to the wires 32, 33 by U-shaped wire pieces 39, 40. Like the wire pieces 8, 27, 28, the U-shaped wire pieces 39, 40 intersect and thus substantially shield the edges of the wires 36. The free ends of the wires 32, 33 are formed with open hooks 42, 43, for purposes presently more fully appearing.

The basket may, if desired, be shipped or stored flat, namely as shown in FIG. 1. However, it has been found to be more economical to fold the several walls of the basket along their hinge connections such that the back wall 2 is folded back on the bottom wall 3 and the side walls 6, 7 are folded to lie on opposite sides to the front wall 4. In this position, the basket is not truly flat, but is in a collapsed position in which it is almost flat and is, therefore, only a fraction of the height of the set-up basket. Such a basket is capable of being packaged in a relatively narrow rectilinear carton.

In setting up the basket 1 from the position of FIG. 1 to that shown in FIG. 2, the front wall 4, together with the side walls 6, 7, are swung up about the hinge line at the wire 21 and the back wall 2 is swung upwardly about the hinge line at the wire 19. The two sides walls are then swung about their hinge lines at wire portions 30, 31 until both sets of hooks 42, 43 are respectively in alignment with the wire portions 10, 10a. Then the back wall 2 is pushed away from the front wall 4 until the wire portions 10, 10a seat in the hooks 42, 43. The upper hooks 42 have openings which are narrower than the diameter of the wire portions 10, 10a. However, the hooks 42 will yield sufficiently to permit the wire portions 10, 10a to snap thereinto so that, when engaged, the wire portions 10, 10a will not come out of the hooks 42 unless they are intentionally pulled away therefrom. This keeps the basket assembled.

In the form of the invention herein illustrated, the side walls 6, 7 are of a generally trapezoidal shape so that in the set-up basket the tops of the side walls will angle downwardly toward the front wall 4 which will, in turn, angle forwardly and upwardly from the bottom wall 3. Furthermore, the tops or bight portions of the U-shaped wire members 27, 28, 39, 40 will be upwardly presented and there will be no sharp ends of wires at the top opening of the basket.

An important feature of the invention lies in the fact that the basket may be mounted on a board 45 having vertically and horizontally spaced holes 46 therein. For this purpose, there are peg or mounting hooks 47, 47 on the wire 8. Each mounting hook 47, 47 has two angularly related portions 49, 50 which are preferably at or nearly right angles to each other. Each mounting hook 47, 47 is also bent to form a loop 51 which provides a freely swivelling connection of the mounting hook to the wire 8. Likewise, the mounting hooks may be moved axially of the wire 8.

To mount the basket onto the board 45, the basket is moved horizontally toward the board. The hooks 47 will hang downwardly as shown in FIG. 5. With the hook portions 50 in alignment with two selected holes 46 in the board, the hook portion 50 of each mounting hook is inserted into the associated hole, as shown in broken lines in FIG. 5. Then the mounting hooks are rotated about ninety degrees to pass the other hook portions 49, 49 into the holes and bring the hook portions 50, 50 flush against the back side of the board 45. The basket is slightly lowered as the mounting hooks are rotated. However, the basket need not be rotated as would be the case if the hooks were rigidly mounted thereon. The hooks 47 hold the upper end of the basket onto the board 45. The weight of the basket and its contents cause the loops 15, 16, 17 on the bottom wall 3 to abut the front surface of the board 45.

In compliance with the requirements of the patent statutes, we have herein shown and described a preferred embodiment of the present invention. It should be understood, however, that the invention is not limited to the precise construction and method herein shown and described, the same being merely illustrative of the principles of the invention. What is considered new and desired to be secured by Letters Patent is:

1. A basket having an open top and comprising a back wall, a bottom wall, a front wall, and opposed side walls, each wall having intersecting wire rods that are secured together such that each wall is an open grid, one margin of the back wall being hinged to one margin of the bottom wall, one margin of the front wall being hinged to another margin of the bottom wall that is parallel to the first-mentioned margin of the bottom wall, said back, bottom and front walls defining opposed side margins, one margin of each side wall being hinged respectively to each of said opposed side margins, each of said hinge connections being formed by loops of wire from one member that embrace a wire of another member, cooperating means on another margin of each side wall and one of the other walls for releasably retaining the basket in a set-up position, said cooperating means including a hook on one wall releasably engaging a wire on an adjacent wall, said hinge connections being such that when said cooperating means are released the walls are capable of being folded about the hinge connections to a collapsed position of the basket in which the latter is partially flattened and has a thickness that is only a fractional part of the height of the basket in its set-up position, and mounting hooks on one wall for attaching the structure defined by the walls to a fixture having holes sized for receiving the mounting hooks, each mounting hook having angularly related portions such that the hook is mounted on the fixture by initially inserting one of the angularly related portions of the hook through a hole and then rotating the hook to its final position in which the other angularly related portion projects away from said fixture and toward said wall upon which the hooks are mounted and the first-mentioned angularly related portion is flush against the side of the fixture that is remote from said last-mentioned one wall, said hooks each being swivelly attached to said last-mentioned wall and slidable toward and away from each other so that the basket can be mounted onto the fixture without rotation of the structure defined by the walls, the swivel connections of the mounting hooks being at the top margin of the back wall along a wire section thereof, the hook and wire that are included in said cooperating means having a snap fit, and the grids forming the side walls and front wall comprising longitudinal wires joined together by U-shaped wire pieces which extend transversely of said longitudinal wires and which substantially intersect and shield the opposite edges of those wires, the bights of said U-shaped members being upwardly presented and in part defining the top margins of said side walls and front wall.

References Cited

UNITED STATES PATENTS

| | | | |
|---|---|---|---|
| 3,289,993 | 12/1966 | Thalenfeld | 248—225 |
| 3,310,271 | 3/1967 | King | 248—225 |
| 1,443,836 | 1/1923 | Digby | 220—6 |
| 1,915,625 | 6/1933 | Smith | 211—132 XR |
| 3,003,644 | 10/1961 | Hildebrand | 211—181 XR |
| 3,244,391 | 4/1966 | Brunette | 211—87 |
| 3,268,087 | 8/1966 | Kramer | 211—86 |

ROY D. FRAZIER, *Primary Examiner.*